United States Patent
Smith

(10) Patent No.: US 6,918,083 B2
(45) Date of Patent: Jul. 12, 2005

(54) TOOL FOR MARKING UP ELECTRONIC DOCUMENTS

(75) Inventor: Thomas W. Smith, Fredericksburg, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 799 days.

(21) Appl. No.: 09/864,819

(22) Filed: May 24, 2001

(65) Prior Publication Data

US 2004/0205647 A1 Oct. 14, 2004

(51) Int. Cl.⁷ .............................................. G06F 17/00
(52) U.S. Cl. ........................ 715/511; 715/531; 715/808; 715/809
(58) Field of Search ............................. 715/511, 530, 715/531; 345/808, 809

(56) References Cited

U.S. PATENT DOCUMENTS

| | | | |
|---|---|---|---|
| 5,530,861 A | 6/1996 | Diamant et al. | 395/650 |
| 5,752,058 A | 5/1998 | Van De Vanter | 395/793 |
| 5,809,318 A | 9/1998 | Rivette et al. | 395/773 |
| 5,812,130 A | 9/1998 | Van Huben et al. | 345/339 |
| 5,867,112 A * | 2/1999 | Kost | 314/51 |
| 5,924,107 A | 7/1999 | Fukao et al. | 707/530 |
| 6,006,242 A | 12/1999 | Poole et al. | 707/531 |
| 6,009,442 A * | 12/1999 | Chen et al. | 715/522 |
| 6,098,047 A | 8/2000 | Oku et al. | 705/7 |
| 6,119,137 A * | 9/2000 | Smith et al. | 715/523 |
| 6,151,289 A * | 11/2000 | Rope et al. | 369/95 |
| 6,357,006 B1 * | 3/2002 | Pham et al. | 713/176 |
| 6,380,924 B1 * | 4/2002 | Yee et al. | 345/156 |
| 6,704,906 B1 * | 3/2004 | Yankovich et al. | 715/505 |
| 2002/0035731 A1 * | 3/2002 | Plotnick et al. | 725/146 |

OTHER PUBLICATIONS

Biemesderfer, "Graphics Inclusions in Manuscripts" found at http://www.sunspot.noao.edu/general/computing/TeX/local/postscript/ (Jun. 7, 1996).*

"What is a Zip File, Anyhow?" archived Feb. 29, 2000, (http://web.archive.org/web/20000229130845/www.winzip.com/aboutzip.htm).*

Microsoft Word 2000 (C) 1999, help file and screenshots.*

Microsoft(R) Product Support Services Application Note (Text File) WD0910: File Conversions Questions and Answers, Revision date Oct. 1993, found at http://files.chatnfiles.com/The%20Pier%20Shareware%204/047/WD0910.Zip.*

* cited by examiner

Primary Examiner—Heather R. Herndon
Assistant Examiner—Adam Queler
(74) Attorney, Agent, or Firm—James B. Bechtel, Esq.; Scott R. Boalick, Esq.

(57) ABSTRACT

Enclosed is a tool that is used to review and/or alter electronic documents each of which may have a different format. The mark-up tool is provided with a color-coded scheme to highlight where an electronic document is to be changed and to indicate the status of the change.

1 Claim, 4 Drawing Sheets

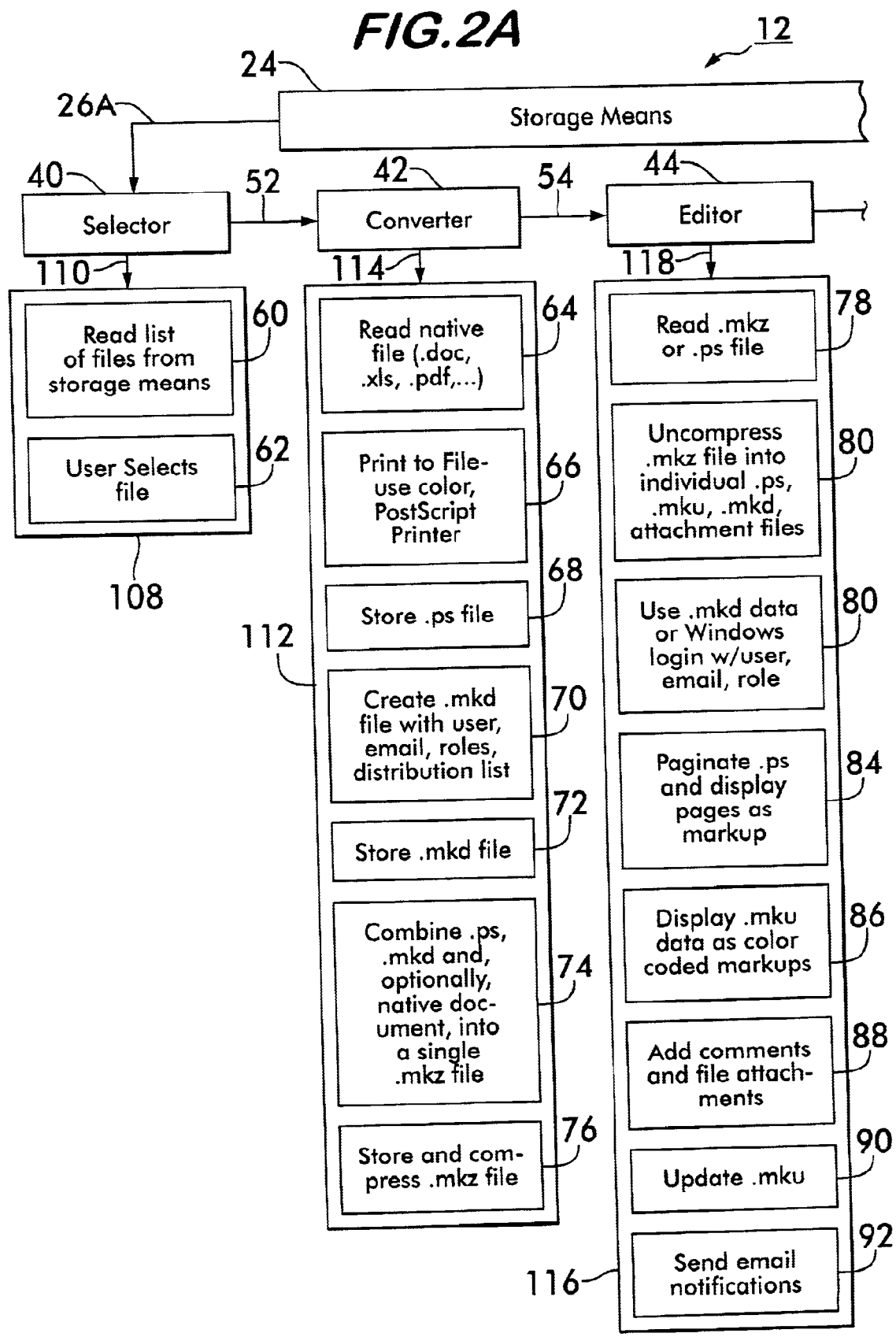

TOOL FOR MARKING UP ELECTRONIC DOCUMENTS

STATEMENT OF GOVERNMENT INTEREST

The invention described herein may be manufactured and used by or for the Government of the United States of America for governmental purposes without the payment of any royalties thereon or therefor.

SEQUENCE LISTING

The computer program listing appendix defined by a CD labeled EDMS Markup Tool Version 3.2 containing the Install Markup.exe file is herein incorporated by reference.

BACKGROUND OF THE INVENTION

1. Field of the Invention

The present invention relates to a tool and method of operation thereof used in operative cooperation with a computer to allow a user to review and/or alter electronic documents having different machine or native language, and each document possibly having a different format.

2. Description of the Related Art

The obtainment of a paperless office or a paperless development of an engineering task has long been predicted, but has not yet been realized. Although paper usage has been reduced in some organizations, it has increased in others and whereas computers have helped in managing paper work, they have made it easy to turn out even more documents. Further, because of the many users or engineers involved in the operation of an office or in the development of an engineering task, the utilization of computers creates a still further problem in that the documents produced are commonly generated by computer having different native language each of which may have different formats requiring specialized handling for each document.

The goal of a paperless office or a paperless development of an engineering task may be more readily realized if a tool is provided to allow the user or engineer to review and/alter the electronic documents. Unfortunately, because of the number of documents involved and the number of different formats inherent in these documents, the utilization of a single tool for modifying or changing electronic documents is hindered. It is desired that a single tool be provided for use with the operative cooperation of a computer to allow a user to review and/or alter electronic documents generated in different native languages having different formats.

OBJECTS OF THE INVENTION

It is a primary object of the present invention to provide for a tool used in operative cooperation with a computer to allow a user to review and/or alter different electronic documents each having different formats.

It is a further object of the present invention to provide a scheme whereby changes to the document may be accomplished by users utilizing a network.

It is a further object of the present invention to provide for a tool used to review and/or alter electronic documents and to notify the associated authority of the changes about to be made before the changes are actually accomplished.

It is a further object of the present invention to provide for a tool to allow a user to review native documents, accept or reject change requests to the documents, notify the submitter of a requested change, and pass the change request to an associated authorization agency before the changes are actually accomplished.

SUMMARY OF THE INVENTION

The invention is directed to a mark-up tool and a method of operation thereof used in operative cooperation with a computer to allow a user to review and/or alter a plurality of electronic native documents each possibly having a different format.

The mark-up tool comprises a selector, a first converter, and an editor. The selector is used for selecting and retrieving one of the stored plurality of electronic native documents. The first converter is used to convert the native documents to an electronic document having a common format. The mark-up tool is used for reviewing and changing the selected document with the portion to be changed of the document highlighted in a color rectangle.

BRIEF DESCRIPTION OF THE DRAWINGS

A better understanding of the present invention may be realized when considered in view of the following detailed description, taken in conjunction with the accompanying drawings wherein.

DETAILED DESCRIPTION OF THE PREFERRED EMBODIMENTS

Figure 1:
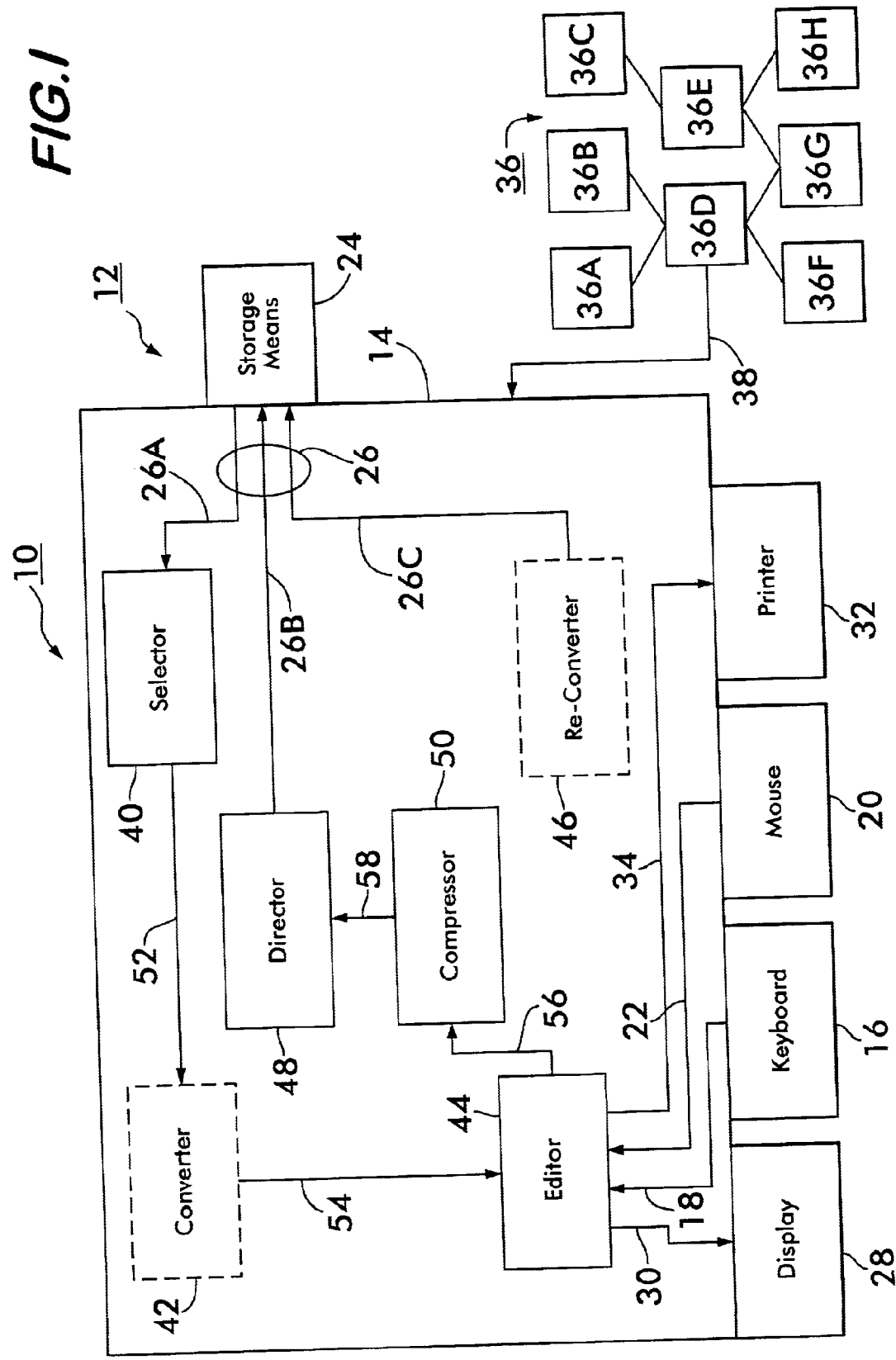
FIG. 1 is a block diagram illustrating the operation of a mark-up tool of the present invention.

Referring to the drawings, wherein the same reference number indicates the same element throughout, there is shown in FIG. 1 a block diagram of an arrangement or system 10 reducing or even eliminating the amount of paper work involved in the conduct of business in an office or in an engineering project brought to fruition by engineers. The present invention is primarily related to a mark-up tool 12 that is used in an operative relationship with a computer 14.

The computer 14 may be of a conventional type having a keyboard 16 that is serviced by a communication channel 18, a mouse 20 that is serviced by a communication channel 22, a storage means 24 that is serviced by a communication channel generally identified by reference number 26 and comprised of signal paths 26A, 26B, and 26C, a display means 28 that is serviced by a communication channel 30, and a printer 32 that is serviced by a communication channel 34. Preferably, the computer 14 services a network 36 comprised of workstations 36A, 36B, 36C, 36D, 36E, 36F, 36G, and 36H by way of a communications channel 38.

The mark-up tool 12 handles multiple files some of which are identified herein by abbreviations given in Table 1, along with a general description thereof.

TABLE 1

| ABBREVIATION | GENERAL DESCRIPTION |
| --- | --- |
| doc | Microsoft Word file extension |
| xls | Microsoft Excel file extension |
| pdf | Portable Document Format |
| ps | Postscript |
| mkz | EDMS Markup Tool file extension (markup zip file) |

TABLE 1-continued

| ABBREVIATION | GENERAL DESCRIPTION |
|---|---|
| mku | EDMS Markup Tool file update extension (extension for markup file) |
| mkd | EDMS Markup data file extension |

The mark-up tool 12 comprises a plurality of program segments associated with a selector 40, a converter 42, an editor 44, a re-converter 46, a director 48, and a compressor 50. The program segments of the mark-up tool 12 may be written in the program language of VC++6.0® which is a trademark of the Microsoft Corporation. In general, the selector 40 receives, via signal path 26A, a list of files from storage means 24 and transfers the users selected file to converter 42, via signal path 52. The converter 42, via signal path 54, transfers compressed mkz file that includes ps, mkd, and native document to the editor 44.

The editor 44 transfers, via communication channel 30, markup, surface, and color-coded markup overlays, to the display 28. The editor 44 receives, via communication channel 18, user entered markup via keyboard 16, and also receives, via communication channel 22, user commands from the mouse 20. The editor 44 also transfers, via communication channel 34, markup document with overlays or markup summary and reports to the printer 32. Still further, the editor 44 transfers, via signal path 56, updated mku file and attachments to the compressor 50.

The compressor 50 transfers, via signal path 58, compressed mkz file that includes ps, mkd, mku, and attachments to the director 48 which, in turn, transfers, via signal path 26B, the request to store .mkz file to the storage means 24. The storage means 24, via signal path 26C, transfers markups from .mku to native file and store information to the re-converter 46.

The mark-up tool 12 allows users to use one single tool and one common procedure to identify, change, review, and update electronic documents that are stored in the storage means 24. The mark-up tool 12 provides a single tool having intuitive mark-up capabilities that does not require knowledge of native document applications each of which may have a different format, such as those derived by application programs Word, Excel, or other applications installed in to the computer 14.

In general, the selector program segment 40 is used for selecting and retrieving one of a plurality of electronic native documents stored in storage means 24.

The converter 42 program segment is used for changing the native document along with its format to a common format. In one embodiment the common format is a post-script (p.s.) file. In the operation of the converter 42, native documents are pre-converted into .ps files. The .ps files are combined with user created .mkd files, and, optionally, the native document, and compressed to make an .mkz file. The .mkz files are stored on a web site or desktop PC, such as found in network 36. Use of the .ps common file format makes the mark-up tool 12 independent of native file formats.

The editor 44 program segment is provided for viewing and/or changing the selected electronic document. More particularly, the editor 44 opens and uncompresses the .mkz file, accepts user markups, writes user markups to an .mku file, and finally, combines and compresses the .ps, .mkd, .mku, and attachments into an updated .mkz file.

The re-converter 46 program segment is provided for changing the common format of the selected document back to the format of the native document that was originally retrieved from the storage means 24. In the operation of the re-converter 46, the user manually transfers, using the mark-up tool and the native document editor, markups from the markup tool 12 to the native document.

The director 48 program segment saves the .mkz file to storage means 24.

The compressor 50 is preferably used for compressing the data of the native document after it has been changed to its common format.

Most of the displays related to the present invention, utilize animation for projection of the detailed component status. The displays change as the status changes which provides a real-time reporting of the state of the asset and its readiness. This maximizes the human-machine comprehension so that response time is minimized. The eye is very adept at detection of changes.

In operation, the mark-up of the electronic document being displayed on display means 28 is accomplished by using the mouse 20 to point to the top-left of the area to be marked, then holding down the left mouse button, dragging the now pointer to the bottom right of the area to be changed or reviewed, and then releasing the left mouse button. A color-coded rectangular is provided that now surrounds the area to be marked.

The color and appearance of the rectangle indicates the state of the mark-up (blue rectangle=submitter, green rectangle with dash checked stripes=applied, a red rectangle with dashed X's stripes=rejected, a green rectangle with checked stripes=approved, and a red rectangle with an X stripe=disapproval.

On releasing the left mouse button, a mark-up dialogue containing the document to be reviewed or altered, is displayed and allows the user to make such changes.

After the user makes his changes, an E-mail address, comments and the mark-up state to be entered changes appears on the display means and is transmitted to one of the users of the network 36. The color of the rectangle is changes by clicking a corresponding state radio button (not shown) appearing on the display means 28. Also when entering commands, one of the state radio buttons may be checked before commas can be entered. When marked areas overlap, clicking the outermost (last) mark-up, causes the editor 44 dialogues to be displayed chronologically from the oldest to the most recently applied mark-up. Clicking the okay/next button advances to the next mark-up. Further details of the mark-up tool 12 may be further described with reference to FIG. 2 composed of FIGS. 2A and 2B, which cumulatively illustrate further details of the program segments 40, 42, 44, 46, and 48 which, in turn, are comprised of sub-program segments shown in FIG. 2 and given in Table 2.

TABLE 2

| PROGRAM SEGMENT | SUB-PROGRAM SEGMENTS |
|---|---|
| Selector 40 | 60 read list of files from storage means |
|  | 62 user selects file |
| Converter 42 | 64 read native file (doc, xls, pdf, . . .) |
|  | 66 print to file-use color, post-script printer |

TABLE 2-continued

| PROGRAM SEGMENT | SUB-PROGRAM SEGMENTS |
| --- | --- |
| Editor 44 | 68 store .ps file<br>70 create .mkd file with user, email, roles, distribution list<br>72 store .mkd file<br>74 combine .ps, .mkd, and optionally native document into a single .mkz file<br>76 store and compress .mkz file<br>78 read .mkz or .ps file<br>80 uncompress .mkz file into individual .ps, .mku, .mkd, attachment files<br>82 use .mkd data or Windows login w/user, email, role<br>84 paginate .ps and display pages as markup<br>86 display .mku data as color coded markups<br>88 add comments and file attachments<br>90 update .mku<br>92 send email notifications |
| Re-converter 46 | 94 open .mkz file in markup tool<br>96 open native document in native tool<br>98 transfer markups from markup tool to native document<br>100 save updated native file in native format |
| Director 48 | 102 save .mkz file to storage means |
| Compressor 50 | 104 read .ps, .mku, .mkd, attachments<br>106 combine/compress files into a single .mkz file |

Figure 2B:
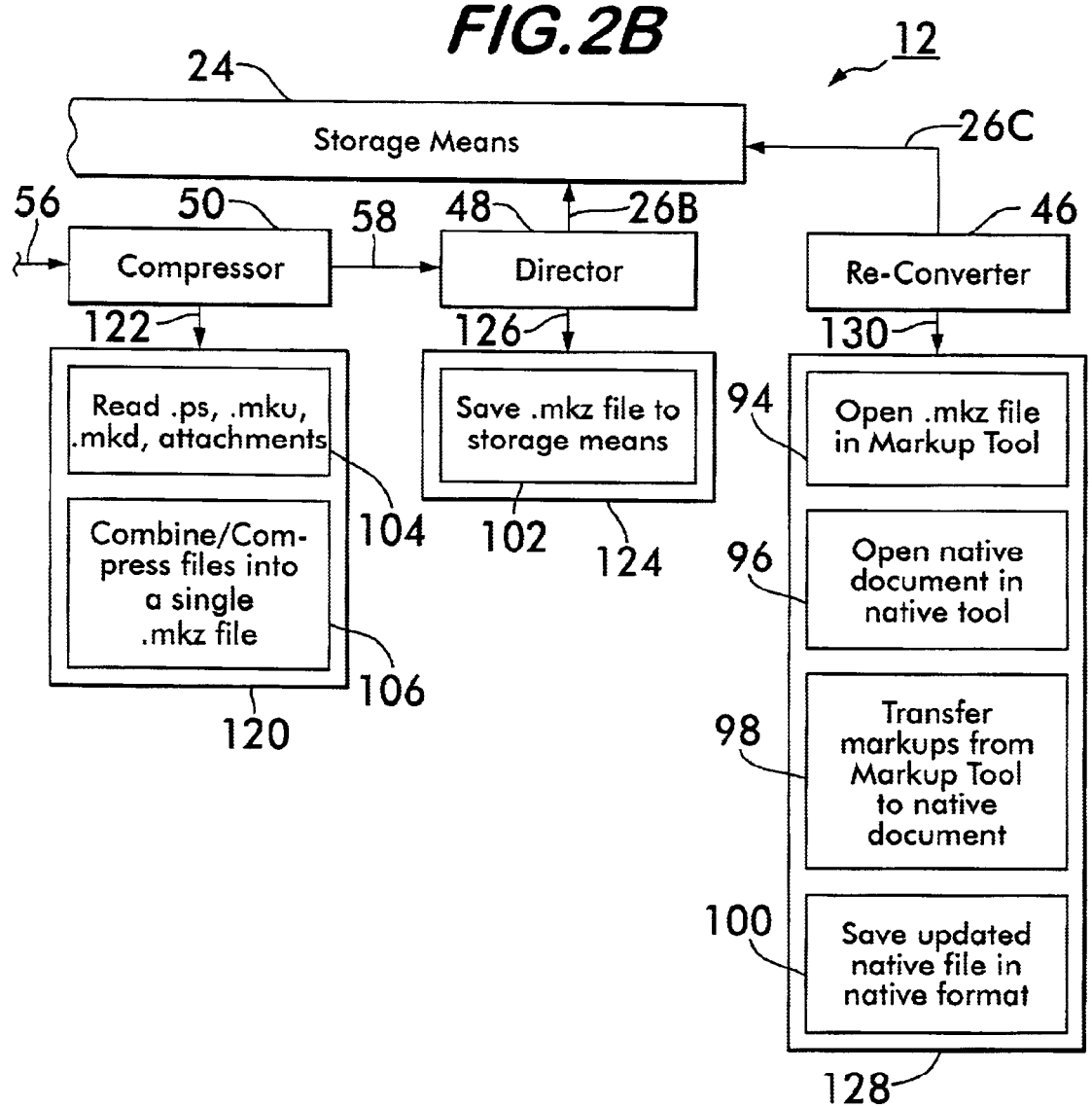
FIG. 2 is composed of FIGS. 2A and 2B each of which illustrates details of respective elements making up the mark-up tool of FIG. 1.

FIG. 2 illustrates the individual flow of each of the program segments 40, 42, 44, 46, 48, and 50 of FIG. 1 whose direction of flow in FIG. 2 is the same as indicated in FIG. 1, and wherein program segments 40, 42 and 44 are shown in FIG. 2A, and program segments 46, 48, and 50 are shown in FIG. 2B.

Selector segment 40 comprises routines 108 made up of subprogram segments 60 and 62. The routines 108 are activated by selector program 40, via signal path 110, causing the sequential performance of subprograms 60 and 62, whereupon at the completion of subprogram 62, the selector segment 40 passes control to the converter segment 42, by way of signal path 52.

The converter segment 42 comprises routines 112 made up of subprogram segments 64, 66, 68, 70, 72, 74, and 76. The converter segment 42 activates the routines 112 by way of signal path 114. Upon completion of the last subprogram segment 76 of the routines 112, control is passed by converter segment 42 to editor segment 44, by way of signal path 54.

Editor segment 44 is comprised of routines 116, which, in turn, are comprised of subprograms 78, 80, 82, 84, 86, 88, 90, and 92. The subroutines 116 are activated by editor segment 44, by way of signal path 118. The subroutines 116 are then sequentially performed and upon the completion of subprogram 92, control is passed by editor 44 to compressor segment 50, by way of signal path 56.

Compressor segment 50 is comprised of routines 120 comprised of subprograms 104 and 106. The compressor segment 50 activates the routines 120, by way of signal path 122 and upon completion of subprogram 106, the compressor segment 50 passes control to the director segment 48, by way of signal path 58.

The director segment 48 is comprised of routines 124 which, in turn, are comprised of subprogram 102. The routines 124 are activated by director segment 48, by way of signal path 126. Upon completion of subprogram 102, information is stored in storage means 24 by way of signal path 26B.

FIG. 2 further illustrates the re-converter segment 46 comprised of routines 128 which, in turn, are made up of subprogram segments 94, 96, 98 and 100. The re-converter segment 46 is manually activated by the user to perform transfer using the mark-up tool 12 and the native document editor, with the mark-ups made up from the mark-up tool 12 utilizing the native document. Upon completion of the last subprogram segment 100 of the routines 128, information is passed back, via signal path 26, to storage means 24. The operation of the mark-up tool 12, more particularly, the available options that are displayed on the display means 28 for selection by a user may be further described with reference to FIG. 3.

Figure 3:
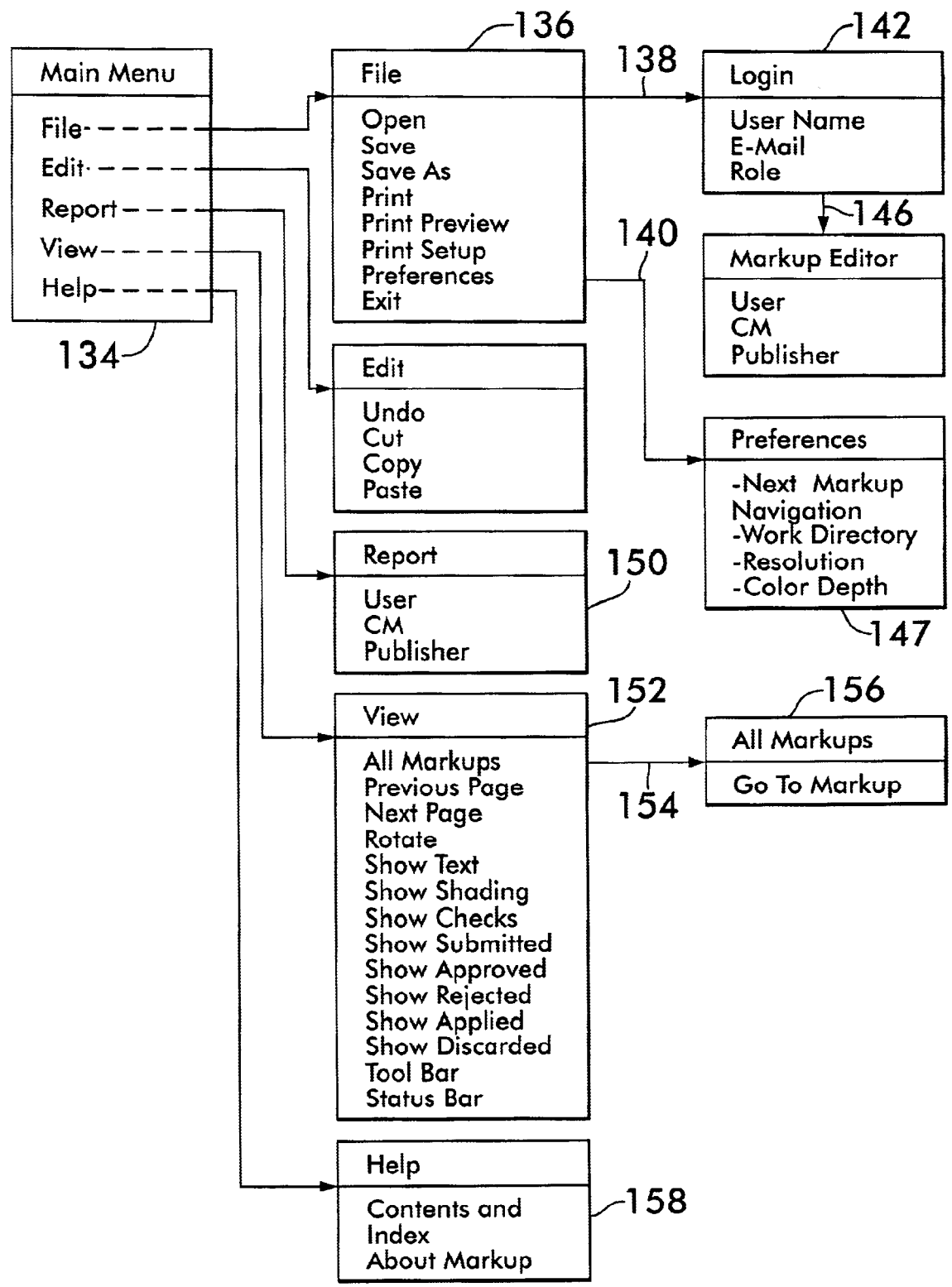
FIG. 3 illustrates the main menu of available screen options for use with the mark-up tool of the present invention.

FIG. 3 shows the selectable options 132 that may be accomplished by highlighting the option with the mouse 20 or cursor keys and then clicking the mouse or pressing enter on the keyboard 16. The main menu 134 has selectable options File, Edit, Report, View, and Help. The selection of the file option causes the selections identified as file 136 to be made available as shown in FIG. 3. The file option 136, in turn makes available, via signal paths 138 and 140, different options with signal path 138 providing for the login option 142.

The login option 142 has the sub-options shown in FIG. 3 and allows for the selection of a mark-up editor 144, via signal path 146 shown in FIG. 3.

The file option 136, via signal path 140, also makes available the preferences 147 selection made up of the sub-options shown in FIG. 3.

The selection of the edit option of the main menu 134 makes available the sub-options for edit 148 shown in FIG. 3.

The report option selectable from the main menu 134 makes available sub-options for report 150 shown in FIG. 3.

The view option of the main menu 134 makes available the sub-options for view 152 shown in FIG. 3. In addition, the all markups 156 options may be provided for a sub-option (all markups of view 152) by way of signal path 154 as shown in FIG. 3.

The help option selectable from the main menu 134 makes available the sub-options of help 158 shown in FIG. 3.

It should now be appreciated that the practice of the present invention provides for a mark-up tool that is used in operative cooperation with the computer to allow a user to review and/or alter a plurality of electronic native documents each of which may have different formats and each of which are stored in the computer.

It should also be appreciated that the practice of the present invention provides for a mark-up tool that allows users a single device (mark-up tool) that has a common process to identify, review, and change different electronic documents each having a different format.

What I claim is:

1. A method used in operative cooperation with a computer to allow a user to review and alter a plurality of electronic native documents, each of which may have a different format and each of which is stored in said computer, the method comprising:

selecting and retrieving one of said stored plurality electronic native documents;

changing the format of said selected native document to a common format;

reviewing and changing the selected document;

providing a mouse for pointing to an area of a document displayed on said display means which is to be reviewed and/or altered;

using the mouse to point at the top left area of the displayed document to be reviewed and/or altered;

dragging the now pointer created by the mouse to the bottom right area of the displayed document to be reviewed and/or altered;

providing a color-coded rectangle surrounding an area encompassed by said dragging, said color-coded rectangle being a color selected from the group consisting of blue, green, and red; and wherein said color-coded rectangle further comprises a strip that is selected from the group consisting of dashed Xs and dashed checks, releasing the mouse;

providing a dialog on said display to allow a user to enter alterations to information confined in said color-doced area; and entering said alterations.

* * * * *